(12) United States Patent
Schuster

(10) Patent No.: US 8,328,456 B2
(45) Date of Patent: Dec. 11, 2012

(54) FASTENING SYSTEM FOR FIXING AND/OR ALIGNING AT LEAST ONE SENSOR ELEMENT

(75) Inventor: Jonas Schuster, Heerbrugg (CH)

(73) Assignee: Bircher Reglomat AG, Speicher (CH)

( * ) Notice: Subject to any disclaimer, the term of this patent is extended or adjusted under 35 U.S.C. 154(b) by 1383 days.

(21) Appl. No.: 11/496,833

(22) Filed: Jul. 31, 2006

(65) Prior Publication Data
US 2007/0029399 A1    Feb. 8, 2007

(30) Foreign Application Priority Data

Aug. 2, 2005  (DE) .................... 20 2005 012 304 U

(51) Int. Cl.
*F16B 9/02*   (2006.01)
(52) U.S. Cl. .................. 403/196; 403/252; 403/290
(58) Field of Classification Search .............. 403/110, 403/196, 199, 290, 252; 248/73
See application file for complete search history.

(56) References Cited

U.S. PATENT DOCUMENTS

| | | | | |
|---|---|---|---|---|
| 3,523,669 A | * | 8/1970 | Avallone | 248/73 |
| 4,644,614 A | * | 2/1987 | Mizusawa | 24/453 |
| 4,712,939 A | * | 12/1987 | Fujimoto | 403/24 |
| 5,141,186 A | * | 8/1992 | Cusic | 248/73 |
| 5,893,538 A | * | 4/1999 | Onishi et al. | 248/65 |
| 6,105,216 A | * | 8/2000 | Opperthauser | 24/459 |
| 6,572,057 B1 | * | 6/2003 | Roth | 248/58 |
| D538,148 S | * | 3/2007 | Dinh et al. | D8/396 |
| 7,591,442 B2 | * | 9/2009 | Dinh et al. | 248/73 |
| 7,735,270 B2 | * | 6/2010 | Olle et al. | 52/167.9 |
| 2009/0294600 A1 | * | 12/2009 | Dodge | 248/73 |

* cited by examiner

*Primary Examiner* — Joshua Kennedy
(74) *Attorney, Agent, or Firm* — Bachman & LaPointe, P.C.

(57) ABSTRACT

A fastening system for fixing and/or aligning at least one sensor element, in particular an active infrared sensor or the accessory parts thereof, such as printed circuit boards, controls, energy sources etc., in a rail element with at least one fastening element, characterized in that the fastening element can be plugged from a front side into the rail element at any desired position. The object is further achieved by providing a fastening system for fixing and/or aligning at least one sensor element, in particular an active infrared sensor or the accessory parts thereof, such as printed circuit boards, controls, energy sources etc., in a rail element with at least one fastening element, characterized in that at least one sensor element and/or the accessory part thereof can be inserted into at least one fastening element in a fashion capable of being re-released and of being aligned with regard to its inclination and the like.

11 Claims, 3 Drawing Sheets

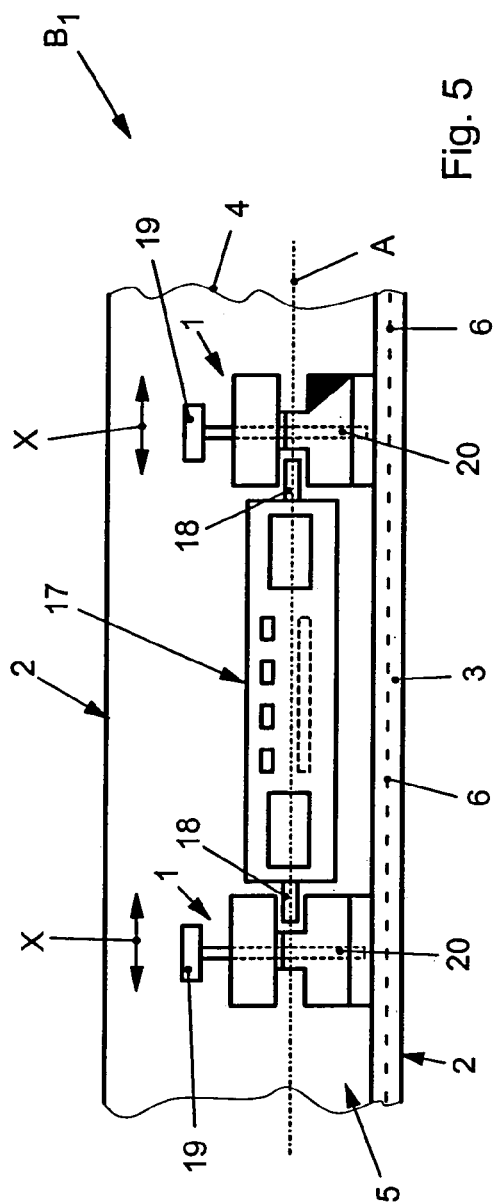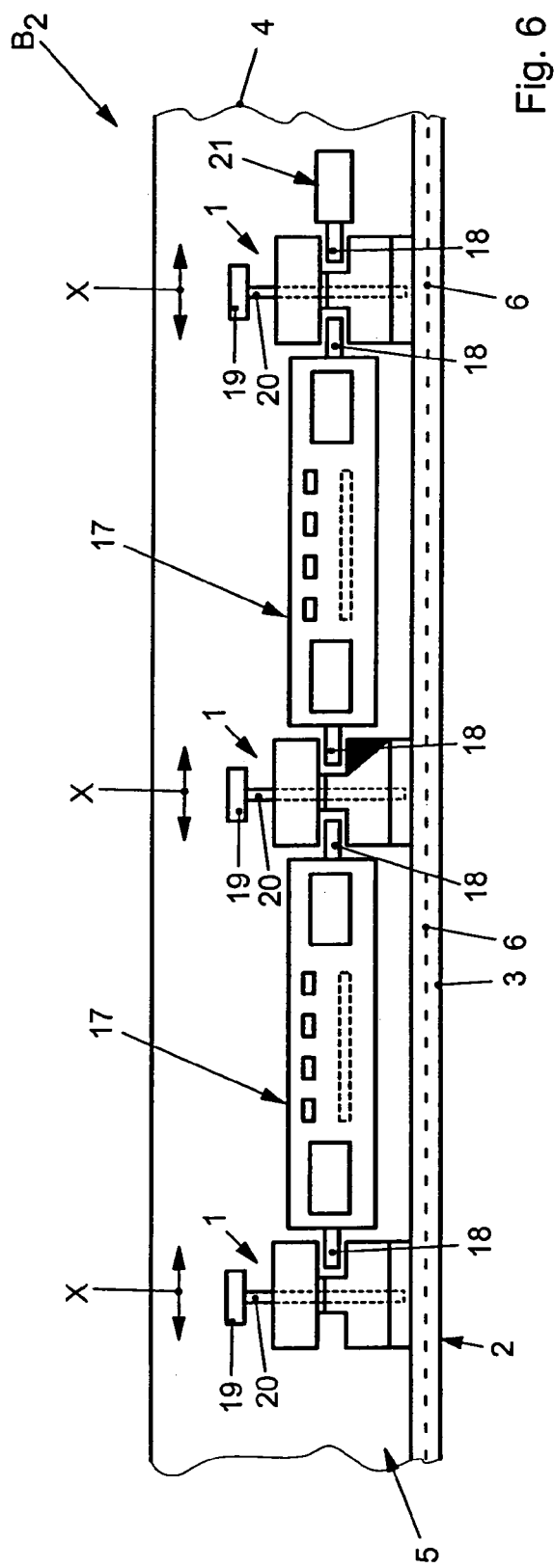

FASTENING SYSTEM FOR FIXING AND/OR ALIGNING AT LEAST ONE SENSOR ELEMENT

BACKGROUND OF THE INVENTION

The invention relates to a fastening system for fixing and/or aligning at least one sensor element, in particular an active infrared sensor or the accessory parts thereof, such as printed circuit boards, controls, energy sources etc., in a rail element with at least one fastening element.

Such fastening systems are known and customary in multifarious forms and designs on the market. They serve, in particular, for fixing and positioning sensors, in particular active infrared sensors, presence detectors or the like.

It is known in this case in the prior art that it is necessary for appropriate bearing blocks to be inserted at the end into conventional rails in a troublesome and complicated fashion in order then to hold a sensor between two bearing blocks.

It is necessary in this case for the bearing blocks to be positioned at a desired location in a troublesome and complicated fashion, and for the sensor to be aligned in accordance with its required inclination in a very troublesome fashion.

An alignment is laborious in the prior art particularly when the sensor is, for example, already mounted above a gate or a door in a rail element or, possibly, needs to be exchanged for maintenance or in the event of a defect.

In addition, conventional bearing blocks or fastening elements for holding sensor elements are cost intensive to produce and complicated to handle.

It is the object of the present invention to produce a fastening system of the type mentioned at the beginning with the aid of which it is possible in a simple and cost effective way quickly to position and align any desired sensor element, as well as its accessory parts, and which facilitates maintenance and setting and is cost effective to produce.

SUMMARY OF THE INVENTION

The object is achieved by providing a fastening system for fixing and/or aligning at least one sensor element, in particular an active infrared sensor or the accessory parts thereof, such as printed circuit boards, controls, energy sources etc., in a rail element with at least one fastening element, characterized in that the fastening element can be plugged from a front side into the rail element at any desired position. The object is further achieved by providing a fastening system for fixing and/or aligning at least one sensor element, in particular an active infrared sensor or the accessory parts thereof, such as printed circuit boards, controls, energy sources etc., in a rail element with at least one fastening element, characterized in that at least one sensor element and/or the accessory part thereof can be inserted into at least one fastening element in a fashion capable of being re-released and of being aligned with regard to its inclination and the like.

In the case of the present invention, it has proved to be particularly advantageous to provide a fastening element for a fastening system which can be re-releasably plugged or clamped very quickly from outside at the end into a front side at a desired location in order to position the sensor element, without the need for the fastening element to be threaded at the end into a rail element.

In addition, the fastening element can be positioned and fixed very quickly in the rail element and merely by applying the hand by actuating a locking element, it being possible at the same time to fix an alignment or a preset inclination of the sensor element in relation to the fastening element or in relation to the rail element.

It has proved to be advantageous in production that a locking element can be used to clamp an end trunnion element of the sensor element in the fastening element and, at the same time, to fix the position of the fastening element itself in relation to the rail element.

In addition, it is also possible for accessory parts such as printed circuit boards, controls, energy sources, rechargeable batteries etc., which serve the purpose of providing support as accessory part for the sensor element, to be re-releasably clamped as appropriate in the fastening element itself.

In addition, it is also possible, for example, for a number of sensor elements arranged next to one another in a row to be clamped there with an interposed fastening element in each case, it being possible respectively to set the desired inclinations of the sensor element, in particular the active infrared sensor. In this way, even after the rail itself has been mounted above a gate, a door or the like, it is possible, for example, very quickly for a desired sensor to be inserted there simply by being inserted at the front through the front side of the threaded element and being accurately positioned and aligned with regard to its required inclination. It is also possible to readjust the inclination latchably or continuously such that a region which it is desired to detect is covered in an optimized fashion.

In this case, in order to display a setting of an inclination of the sensor element in relation to the rail element or in relation to the fastening element in latching strips, appropriate markings or the like can be provided in order to perform presetting of the inclination of the sensor element very easily and quickly.

BRIEF DESCRIPTION OF THE DRAWINGS

Further advantages, features and details of the invention emerge from the following description of preferred exemplary embodiments and with the aid of the drawing, in which

FIG. 5 shows a diagrammatically illustrated top view of the rail element in accordance with FIG. 4 with mutually spaced apart fastening elements inserted through the front side, and a sensor element inserted there between; and FIG. 6 shows a diagrammatically illustrated top view of a further exemplary embodiment of the rail element in accordance with FIG. 4 with inserted fastening elements and sensor elements as well as accessory parts such as printed circuit boards, control, energy sources etc.

DETAILED DESCRIPTION

Figure 1:
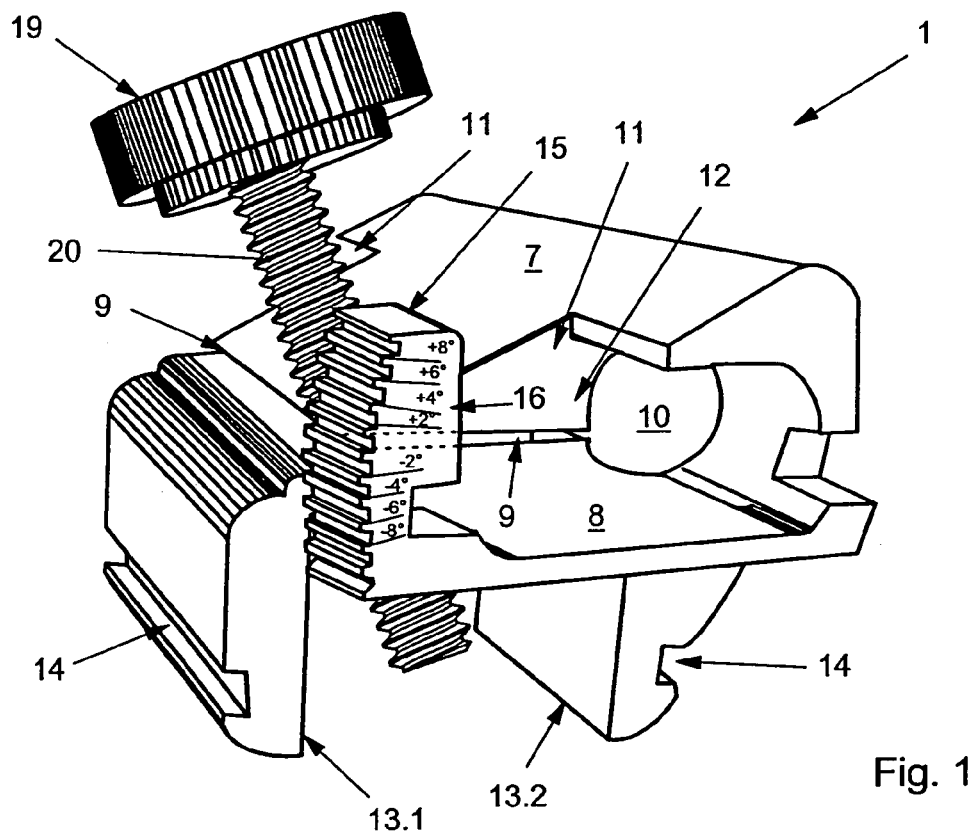
FIG. 1 shows a fastening element for forming an inventive fastening system for insertion into a rail element, in a diagrammatically illustrated perspective view.

In accordance with FIG. 1, a fastening element 1 is a constituent of a fastening system $B_1$ and/or $B_2$, as is shown diagrammatically in FIGS. 5 and 6.

Figure 4:
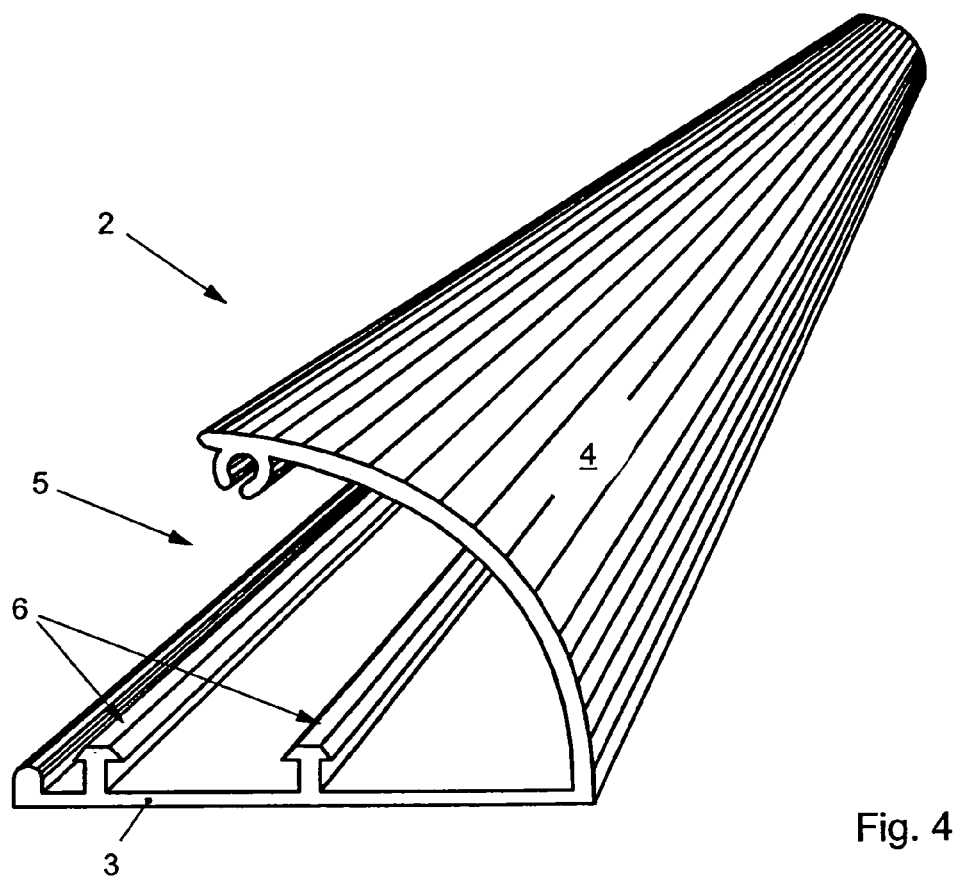
FIG. 4 shows a diagrammatically illustrated side view of a rail element into which at least one fastening element can be inserted.

The fastening system $B_1$ and/or $B_2$ has, inter alia, a rail element 2 as shown in a perspective side view in FIG. 4.

The rail element 2 has an underside 3, a rear wall 4 and a front side 5 which is open in the mounted position. The front side 5 can, if appropriate, be re-releasably sealed by means of covers or the like.

Inside the rail element 2, the underside 3 is preferably provided with a linear guide 6 which serves to hold the fastening element 1.

However, the linear guide 6 can also be a constituent of the rear wall 4 or of a front side 5 (not illustrated). The invention is not restricted thereto.

T-type, L-type, I-type profiles or the like can be used as linear guide 6, in order to hold the fastening element 1 there and to support the latter such that it can be displaced in the longitudinal direction.

As is illustrated in FIG. 1, the fastening element 1 is preferably formed from an upper part 7 and a lower part 8, a clamping gap 9 being formed between the upper part 7 and lower part 8. Here, the upper part 7 and lower part 8 are interconnected in the region of a bearing opening 10, the upper part 7 respectively forming corresponding cutouts 11 at the side in order to form a holding pouch 12 with the lower part 8.

The upper part 7 is preferably designed to be resilient relative to the lower part 8 around the clamping gap 9.

The lower part 8 is firstly followed in a front and rear region by latching elements 13.1 and 13.2 each having elongated parallel latching grooves preferably lying in the outer region.

Here, the respective latching elements 13.1, 13.2 can be resiliently designed relative to one another. It is also intended that, for example, the grooves 14 can be provided lying inside and/or lying outside in the latching elements 13.1 and 13.2. The invention may is not to be restricted thereto.

Via the corresponding latching elements 13.1, 13.2 with integrated latching grooves 14, the fastening element 1 can, as indicated in FIG. 4, be inserted directly through the front side 5 itself into the appropriately fittingly designed linear guide 6 of the rail element 2 via a front side 5 in any desired position, or be latchably fixed therein. Once the fastening element 1 with its latching elements 13.1, 13.2 has been latched and clipped in the linear guide 6, it can be moved to and fro in the linear direction along the linear guide 6, as is indicated in the direction of the double arrow X in FIGS. 5 and 6.

Figure 2:
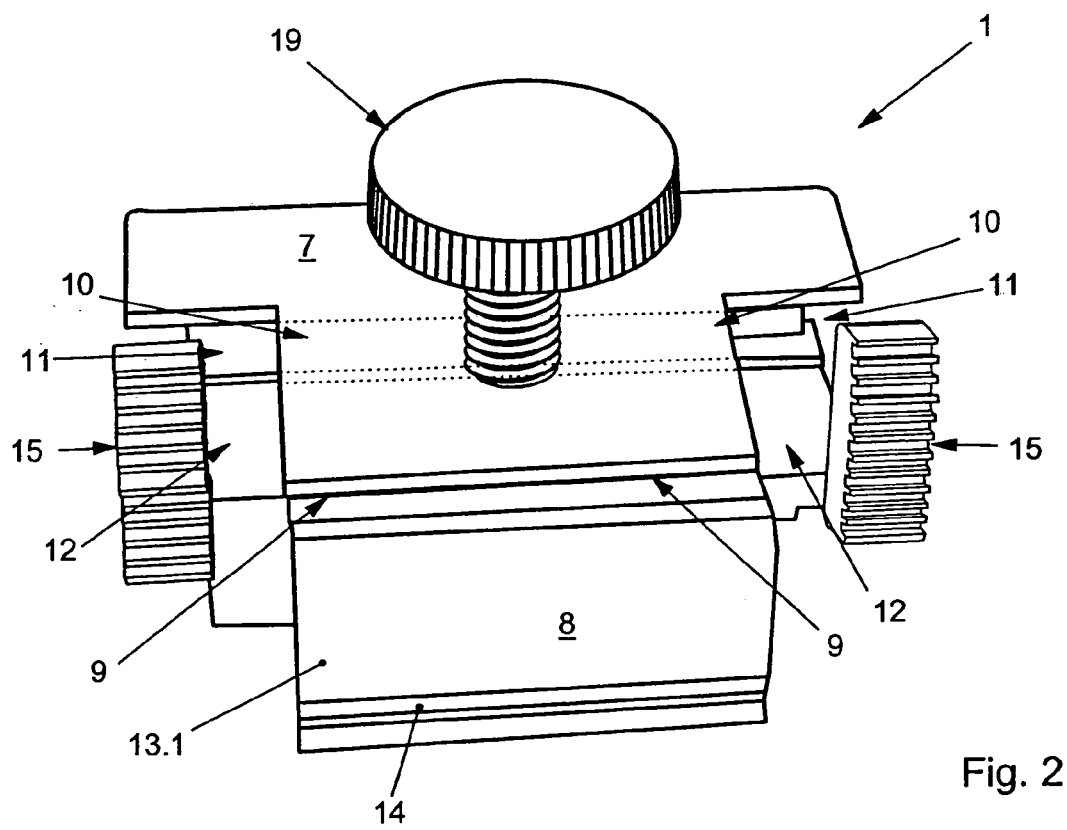
FIG. 2 shows a diagrammatically illustrated top view of the fastening element in accordance with FIG. 1.
Figure 3:
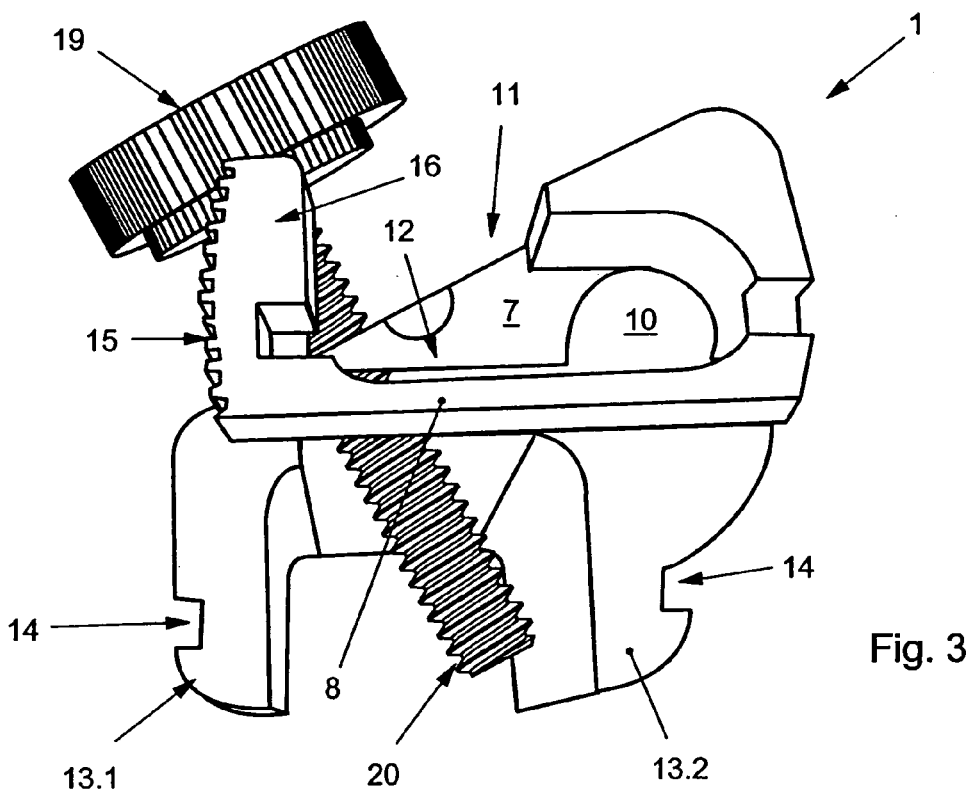
FIG. 3 shows a diagrammatically illustrated side view of the fastening element in accordance with FIGS. 1 and 2.

Furthermore, as is indicated in FIGS. 1 and 2, a latching strip 15 can subsequently can be provided with corresponding markings 16 in a front side region, preferably near the latching element 13.1, in order to set there latchably a desired inclination of a component inserted in the fastening element 1.

However, it is also possible to dispense with the latching strip 15. The latter is not mandatory. It can merely facilitate a desired presetting, inclination or the like.

The mode of operation of the present invention is as follows:

In order for an arbitrary sensor element 17 such as is indicated in FIGS. 5 and 6 to be aligned, inserted and also positioned very quickly at a desired location inside the rail element 2, two fastening elements 1 are preferably clipped in the above-described way through the front side 5 directly into the rail element 2, in particular into the linear guides 6 in the desired region of the rail element.

Here, trunnion elements 18 project from the sensor element 17, preferably at the end, engage in the bearing opening 10 in the X-direction illustrated by appropriate displacement of the fastening element 1, and there support the sensor element 17 swivelably, in particular rotatably.

In this case, a part of the sensor element 18 (not illustrated in more detail here in FIGS. 5 and 6) rests in the cutout 11 or holding pouch 12 of the fastening element.

If a locking element 19 which penetrates the upper part 7 and lower part 8 and preferably bears near the underside 3 of the rail element 2 in the end region of the latching elements 13, is now tightened or actuated, the upper part 7 can be moved slightly against the lower part 8 in order to reduce the diameter of the bearing opening 10, and thereby fixedly clamp trunnion element 18 of the sensor element 17 which is inserted there, doing so in an accurately fitting fashion.

The sensor element 17 can in this case be swiveled or inclined latchably or continuously at a desired angle about an axis A.

Furthermore, it is ensured that by means of the locking element 19, and simultaneously owing to the fact that the trunnion element 18 of the sensor element 17 is fixedly clamped in, because of correspondingly being acted upon by the underside 3 of the rail element and/or latching element 13.1 or 13.2 the fastening element 1 itself ensures that the fastening, element 1 is clamped in place or fixedly clamped and clamped in in the rail element 2 such that movement to and fro in the direction of the double arrow illustrated is no longer possible.

The locking element 19 preferably has a threaded rod 20 which acts in the end region on the underside 3 of the rail element 2 and/or one of the two latching element 13.1 and/or 13.2 and is clamped or pressed against the linear guide 6 in order to fix the fastening element 1 in a stationary fashion in the rail element 2.

The sensor element 17 can preferably be understood as active infrared sensors or any other desired sensor elements, radar sensors or the like which preferably have end trunnion elements 18 at both ends in order to clamp in this sensor element 17 between two fastening elements 1 in a pre-described way and to set it very quickly in accordance with its inclination.

Here, the fastening element 1 itself can be quickly clipped into the rail element 2 through the front side 5 approximately in the region of the desired installation location, and in the event of two fastening elements 1 being clipped in the sensor element 17 is inserted between these via the cutouts 11 or holding pouches 12, after which only the two fastening elements 1 or at least one of the two are displaced one against another in order subsequently after actuation of the locking element 19 to fix the inclination and the location of the sensor element 17 or of two fastening elements 1 in the rail element 2 in an accurately fitting fashion.

In addition, it has proved advantageous in the case of the present invention that the bearing opening 10 or cutout 11 and holding pouch 12 is/are provided on one side, preferably on both sides of the fastening element. In order, as indicated in FIG. 6, for further sensor elements 17 to be held subsequent thereto next to one another in a row in the rail element 2, or for any desired accessory parts 21 such as printed circuit boards, controls, energy sources, rechargeable batteries etc. likewise to be re-releasably fixed there, via a trunnion element 18.

It has proved to be particularly advantageous in the present invention that upon being released by means of a single locking element 19 the at least one fastening element can simultaneously be moved to and fro linearly in the rail element, and at the same time at least one sensor element 17, and/or the accessory parts thereof, inserted in the fastening element 1 can be adjusted and aligned with regard to its inclination. By appropriately tightening the locking element 19, it is possible at the same time for the at least one fastening element to be fixed in one operation relative to the rail element 2, it being possible thereby at the same time to fix by appropriate clamping a desired preset inclination of the sensor element 17 relative to the fastening element 1. This requires only one locking element 19 in order to block or to position the linear movement of the fastening element 1 in the rail element 2, and at the same time to fix a desired inclination of the sensor element relative to the fastening element.

It is possible in this way to effect very quickly not only mounting, but also demounting, an exchange, maintenance or a change in the inclination angle by actuating only one locking element.

The invention claimed is:

1. In combination, a fastening system, a rail element, and a sensor element, comprising at least one fastening element including means for receiving the sensor element in a releasable fashion, the fastening element has two latching elements with latching grooves adapted to engage in the rail element, the two latching elements are compressible towards one another enabling the fastening element to latch tightly in the rail element at any desired location, the means for receiving the sensor element comprises a holding pouch and bearing opening on a side of the at least one fastening element for holding the sensor element, and further including at least one locking element for varying a cross section of the bearing opening, wherein the locking element engages with an upper part and a lower part of the fastening element, and a clamping gap is formed between the upper part and lower part, the locking element at least partially penetrating the lower part and cooperating with the rail element to fix the fastening element relative thereto.

2. The combination according to claim 1, wherein the sensor element has an end trunnion element which engages in the bearing opening.

3. The combination according to claim 1, wherein a corresponding latching strip is provided on the side in the region of the holding pouch.

4. The combination according to claim 3, wherein the latching strip is provided with corresponding markings for setting an inclination quickly and exactly.

5. The combination according to claim 1, wherein the sensor element comprises an active infrared sensor, the sensor element is inserted into the fastening element in a fashion capable of being re-released and of being aligned with regard to its inclination.

6. The combination according to claim 5, wherein the fastening element has two latching elements with latching grooves which engage in corresponding linear guides of the rail element to clip into the linear guide of the rail element at any desired location.

7. The combination according to claim 6, wherein the fastening element can be displaced to and fro along the linear guide.

8. The combination according to claim 7, wherein the fastening element with its latching elements can be inserted directly into the linear guide at any desired position in a re-releasable fashion from an opening region of the rail element between a rear wall and an underside through the front side thereof.

9. The combination according to claim 5, including a locking element for varying the inclination of the sensor element supported therein.

10. The combination according to claim 9, wherein the locking element is a screw element, eccentric screw, eccentric lever, or lever element.

11. The combination according to claim 1, wherein via the one fastening element, the sensor element is moved to and fro linearly inside the rail element, and the sensor element's inclination is simultaneously varied, a locking element for fixing the sensor element at a desired inclination and at a desired location in the rail element after a linear displacement and an alignment of the sensor element as regards its inclination.

* * * * *